US011458384B1

(12) United States Patent
Guidarelli et al.

(10) Patent No.: US 11,458,384 B1
(45) Date of Patent: Oct. 4, 2022

(54) NETWORKED PINBALL MACHINE

(71) Applicant: STERN PINBALL, INC., Elk Grove Village, IL (US)

(72) Inventors: Mark Guidarelli, Sherman Oaks, CA (US); George A. Gomez, Chicago, IL (US)

(73) Assignee: Stern Pinball, Inc., Elk Grove Village, IL (US)

(*) Notice: Subject to any disclaimer, the term of this patent is extended or adjusted under 35 U.S.C. 154(b) by 57 days.

(21) Appl. No.: 17/025,698

(22) Filed: Sep. 18, 2020

Related U.S. Application Data

(60) Provisional application No. 62/902,123, filed on Sep. 18, 2019.

(51) Int. Cl.
*A63F 7/02* (2006.01)
*H04L 67/12* (2022.01)

(52) U.S. Cl.
CPC .............. *A63F 7/027* (2013.01); *H04L 67/12* (2013.01)

(58) Field of Classification Search
CPC . A63F 7/027; A63F 7/02; A63F 7/025; H04L 67/12
USPC .......................................................... 463/3
See application file for complete search history.

(56) References Cited

U.S. PATENT DOCUMENTS

| 4,249,736 | A | 2/1981 | Rosenthal | |
|---|---|---|---|---|
| 5,338,031 | A | 8/1994 | Patla, Sr. et al. | |
| 9,004,996 | B2 * | 4/2015 | Murakami | G07F 17/3295 463/3 |
| 2007/0026918 | A1 | 2/2007 | Sheats, Jr. | |
| 2007/0032288 | A1 * | 2/2007 | Nelson | G07F 17/323 463/16 |
| 2007/0087834 | A1 * | 4/2007 | Moser | G07F 17/322 463/42 |
| 2011/0195764 | A1 * | 8/2011 | Roberts | G07F 17/32 463/7 |
| 2013/0113161 | A1 * | 5/2013 | Guarnieri | G07F 17/38 273/121 R |
| 2013/0159462 | A1 | 6/2013 | Saiki et al. | |
| 2015/0011309 | A1 | 1/2015 | Eloff et al. | |
| 2016/0171839 | A1 * | 6/2016 | Arnone | G07F 17/3295 463/7 |
| 2019/0275416 | A1 * | 9/2019 | Gomez | A63F 7/027 |

* cited by examiner

*Primary Examiner* — Allen Chan
(74) *Attorney, Agent, or Firm* — Greenberg Traurig, LLP

(57) ABSTRACT

A pinball machine includes a cabinet, an inclined playfield, and a ball operable across an upperside of the playfield to conduct a gameplay. A plurality of playfield accessories are mounted to the playfield and configured to interact with the ball during gameplay. A controller operates to control gameplay. The pinball machine includes a network connection operably coupling the controller to a network and a remote server. An access device is configured to identify a user and receive authorization from the controller and the remote server to allow the user to conduct a gameplay.

17 Claims, 15 Drawing Sheets

NETWORKED PINBALL MACHINE

CROSS REFERENCE TO RELATED APPLICATION

This application is a non-provisional application claiming priority from U.S. Provisional Application Ser. No. 62/902,123, filed Sep. 18, 2019, and incorporated herein by reference in its entirety.

FIELD OF THE DISCLOSURE

The present description relates generally to amusement games and more particularly to a networked amusement game device, such as a pinball machine.

BACKGROUND

Amusement game devices, such as pinball machines, redemption games, etc. of the commercial, e.g., revenue generating, and non-commercial, e.g., home entertainment, type are generally well known in the art. By way of example, U.S. Pat. Nos. 5,338,031, 4,249,736, and U.S. Published Application No. 2007/0026918 illustrate and describe amusement game devices, such as pinball games, of the type having a cabinet which houses a playfield, each of which are incorporated herein by reference in their entirety.

In a pinball game, a pinball is typically propelled into play on a playfield with a ball shooter (plunger) assembly and strikes various elements with each strike registering a score and/or a gaming event. Once a pinball leaves the playfield or "drains," the game progresses to the next available ball, until all balls are played and the game is over. As is well known, each pinball game is typically a discrete event, performed on a local machine and completed once the game is over and all the balls are played. In other words, pinball has often been viewed as a single-player game and although multiple players can use a single machine, one at a time, to try to beat the highest score there remains an identifiable desire to provide for a networked pinball machine to allow for variations in simultaneous play on multiple pinball machines and/or persistence in pinball gaming as disclosed below.

A better understanding of the objects, advantages, features, properties, and relationships of the disclosed networked pinball machine will be obtained from the following detailed description and accompanying drawings which set forth illustrative examples, which are indicative of the various ways in which the principles of the networked pinball machine may be employed.

BRIEF DESCRIPTION OF THE DRAWINGS

For a better understanding of the networked pinball machine disclosed hereinafter reference may be had to the attached drawings.

DETAILED DESCRIPTION

The following description of example methods and apparatus is not intended to limit the scope of the description to the precise form or forms detailed herein. Instead the following description is intended to be illustrative so that others may follow its teachings.

With reference to the figures, an amusement game device, in the example form of a pinball machine 10 is now described. It is to be appreciated, however, that this example form for the amusement game device is not intended to be limiting. Rather, those of ordinary skill in the art will appreciated that the networked amusement device assembly disclosed hereinafter can be utilized in any type of amusement game device of the commercial and non-commercial type in which it is desired to create a networked amusement machine as disclosed.

Figure 1:
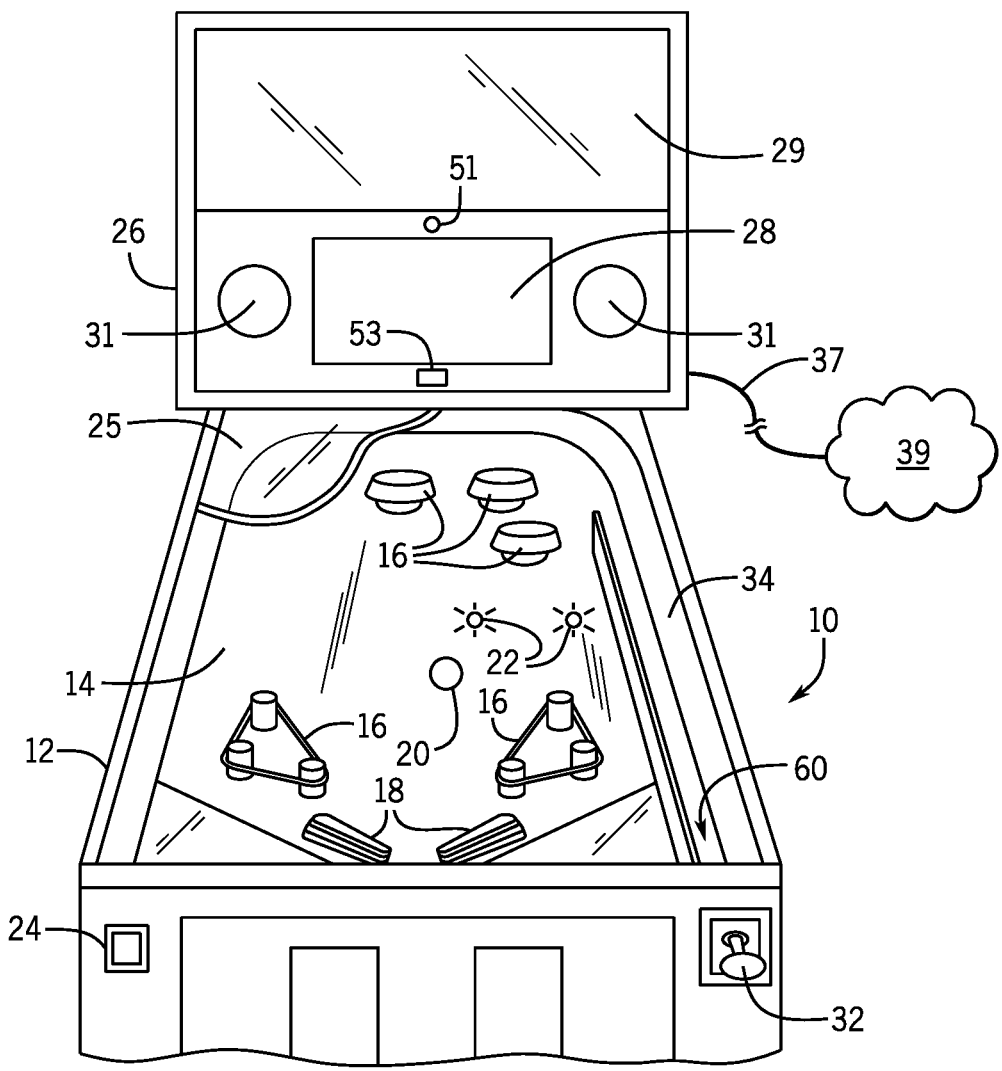
FIG. 1 illustrates an example networked amusement game device in the form of a pinball machine.

The example pinball machine 10 illustrated in FIG. 1 includes a cabinet 12 which houses various apparatus used to define play of a game. Gameplay may be commenced in response to insertion of money, paper or coins referred to collectively as "coins", into a coin accepting device, upon exercising of credits earned, by accepting payment from an account, e.g., via use of a swipe card reading device, a bar code reading device, a near field communications device, etc., and/or by otherwise making game play active, including free play. Upon activation of the game in this manner, gameplay, in the case of the example pinball machine 10, is defined upon an inclined playfield 14 that supports a number of playfield accessories or devices.

More particularly, in the case of the example pinball machine 10, gameplay is generally defined through the use of a pair of flippers 18 to propel a ball 20 relative to an upperside (e.g., a top surface) of the playfield 14 and input devices/accessories associated with the playfield 14. The playfield 14 is usually inclined from the horizontal, such as for instance between approximately 6.5 to 7.0 degrees, such that the ball tends to eventually roll back down the playfield 14 in the direction of the flippers 18. While not intended to be limiting, the playfield accessories or input devices may include elements such as bumpers 16, ramps, rollover switches 22, targets, or other suitable accessory.

The playfield 14 may be covered by a transparent or glass sheet cover 25 to permit viewing of the playfield 14. In addition to the foregoing, the playfield 14 typically includes a plunger element 32 which shoots or launches the ball 20 up an alley 34 onto the playfield 14. The playfield 14 may also include lighting elements—which may also be included as a part of the any of the input devices/accessories—and/or other features as desired. Other player-activated input elements, typically in the form of push-buttons (not shown) on the sides (or other location) of the cabinet 12, are usually provided for controlling operation of the flippers 18 or otherwise interacting with gameplay. The amusement game 10 may also include a backbox 26 which is mounted to overlay a top rear portion of the cabinet 12 and which in this example contains artwork 29, and a game display 28, such as a dot matrix display, CRT, LED or plasma display, or the like. The backbox 26 may also support speakers 31 associated with the game sound system. Within the backbox 26 may be located various ones of the electronic devices/circuits for controlling the operation of the playfield 14, the display 28, general illumination, and the sound system, including speakers 31 and any additional sound system components. Still further, the backbox 26 may optionally comprise a camera 51 and/or a microphone 53, which may be mounted to any suitable portion of the gaming machine 10, and may be separately or integrally mounted as desired, to allow for video and/or sound functionality. Such electronic devices/circuits could also, in whole or in part, be carried within the game cabinet 12, or may be external to the game cabinet and linked to the machine 10 via any suitable wired or wireless configuration. In some examples, the camera 51 and/or of the microphone 53 may be integral with or a supplement to the access device 24, such as in the instance of facial and/or voice recognition.

As previously described, during normal operation, a pinball gameplay is a discrete event, performed for example, on a local machine, such as the example pinball machine 10, and completed once the game is over and all the balls are played. In the present example, however, the example pinball machine comprises a network connection 37 that couples the machine 10 to a network 39, such as the Internet, Intranet, LAN, WAN, cloud server, or other suitable network. The network connection 37 may be any suitable wired connection or wireless connection as desired and may facilitate the communication of the machine 10 with a remote server 41 as disclosed herein.

In addition to the network connection 37, the example pinball machine may include an access device 24, such as an optical device or magnetic device, including a bar code reader, a swipe card reading device, a near field communications device, camera, etc., to facilitate identification of the user of the machine 10 during gameplay. The access device 24 may be constructed separate from, or in combination with the coin acceptance device noted above. In one example, the access device 24 is a bar code reader configured to read a bar code, such as a QR code, located in physical form (e.g., a piece of paper, card, or coupon) and/or in electronic form (e.g., a phone app, etc.). It will be understood that the access device 24 may be any suitable access device capable of identifying a user to the machine 10 and/or identifying or validating the user to the remote server 41.

Figure 2:
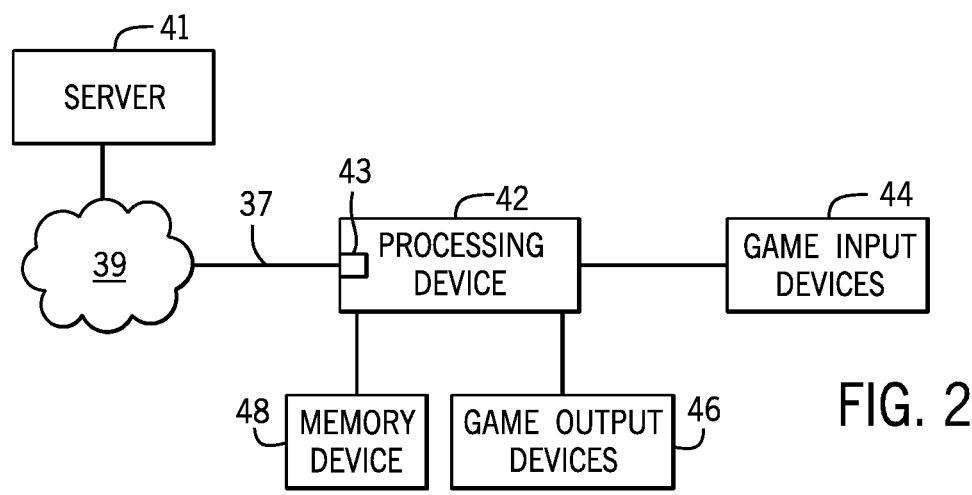
FIG. 2 is an example block diagram of example components of the amusement game device of FIG. 1.

Referring to FIG. 2, for controlling the various devices that form the amusement game, the example pinball machine 10 is provided with a processing device 42 which processing device 42 is, in turn, coupled to game input devices 44, such as switches associated with the cabinet 12, the playfield 14, the access accessory device 24, etc., and game output devices 46, such as lights, bumpers 16, flippers 18, display 28, speakers 31, etc. via one or more buss systems. A memory device 48, such as a RAM, ROM, or the like, stores instructions and data usable by the processing device 42 to control play of the game, the game output devices 46, and the game input devices 44 as necessary based upon signals provided by the game input devices 44. It is to be understood that this illustrated embodiment is not intended to be limiting and that other manners for arranging the devices illustrated in FIG. 2 to provide for control of play of the amusement game can be utilized as needed.

In the present example, the processing device 42 is also electrically coupled to the network 39 and the server 41 through the network connection 37. Accordingly, the processing device 42 includes an input/output device or port 43 that communicates with the network connection 37. The input/output device may be any suitable device, including for instance a receiver, a transmitter, a transceiver, etc. utilizing any suitable protocol.

Figure 3:
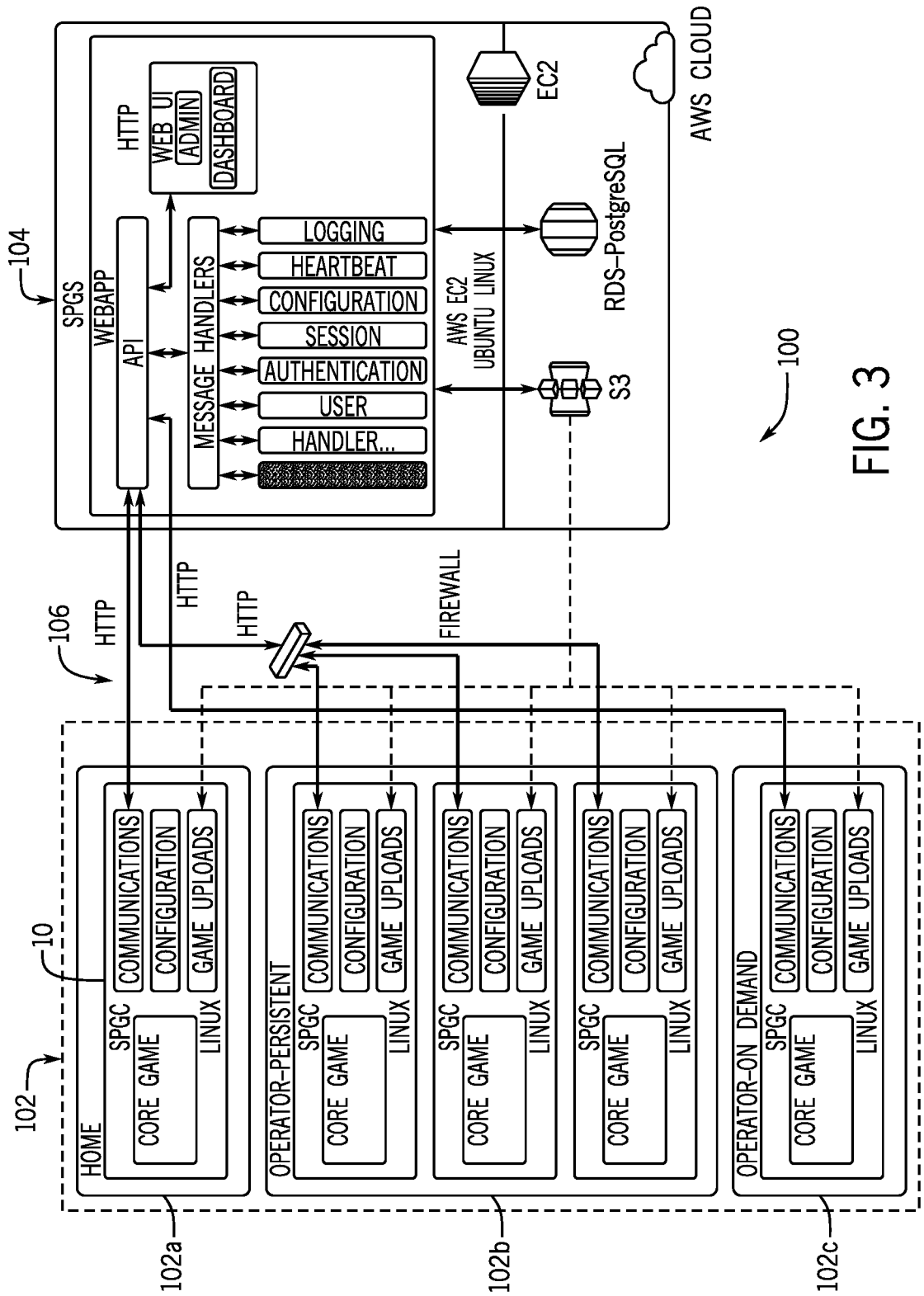
FIG. 3 is an example networked online system showing the example networked pinball machine networked with a remote server.
Figure 4:
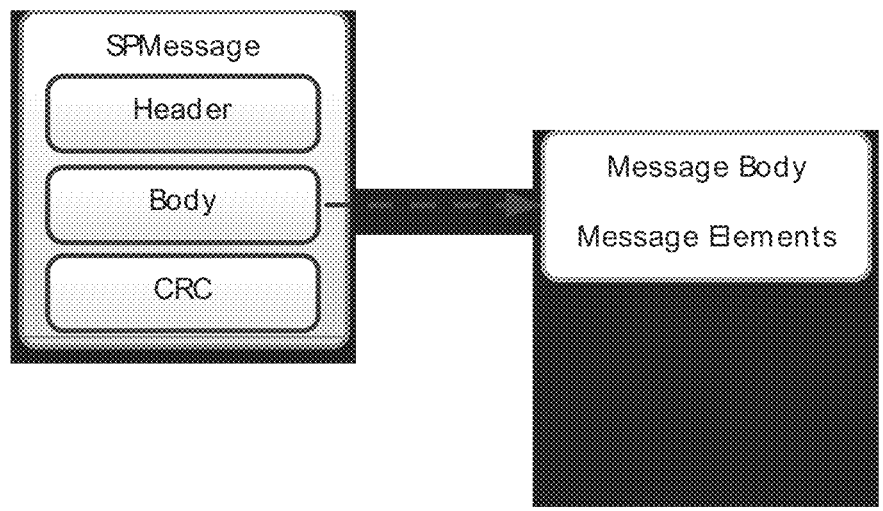
FIG. 4 is an example message format for use with the example networked amusement game device of FIG. 1.

As further illustrated in FIG. 3, a networked online system 100 comprises two major components, namely at least one game within a game client area 102 (e.g., the example pinball machine 10 and/or other suitable client, such as an electronic game or application operating at home 102a, at an operator on a persistent basis 102b, or at an operator on an on demand basis 102c), and a game server 104, (e.g., the example server 41). It will be appreciated by one of ordinary skill in the art that while the illustrated game client area 102 includes one or multiple games in each area 102a, 102b, 102c, there may be any number of games in each location. In addition, as illustrated in dotted lines, each game may communicate with other games either locally or remotely as desired and through the same network connection 37 or through another suitable connection (not shown).

The primary point of interface for all players actively participating in a game will be the game client 102. In particular, the game client area 102 is the part of the system 100 where gameplay and data are generated and transmitted via a network 106, such as the network 39, to the game server 104 for aggregation and for other suitable action by designated server personnel. The game client area 102 provides the game client running the appropriate gaming environment and a connectivity kit, such as the wireless and/or wired network connection 37, to allow for the communication of the game client 102 with the game server 104.

Meanwhile, the game server 104 provides a variety of functions including, for instance, administrative service, data collection services, authentication services, reporting and analytic services, game session service, logging services, database functionality, and time management. In one example of the present disclosure the noted components have the following functions: Administrative Services. These servers are used to manage the system—to manage users, input schedules, create adjustments to be disseminated, create and notify clients of updates to be downloaded, etc.; Data Collection Services. These services are used to collect all data transmitted by game clients; Authentication Services. These services are used to authenticate both machines and users of the system; Reporting and Analytical Services. These services are used by users to provide insight into data collected by the system; Game Session Services. These services establish sessions, manage the state of games, track player activity for services such as tournaments, leaderboards, etc.; Logging Services. These services provide the ability for games to log information on servers as well as the ability to accept and catalog game activity logs, crash logs, etc.; Database. This is the data store where all data is retained for scheduling, adjustments, game downloads, reporting, etc.; and Time Management. These services provide a time synchronization service for games.

System Architecture

Referring still to FIG. 3, each discrete gaming machine (identified as SPGC 10) in the pinball game client area 102 is responsible for all game activities and is the main interface point for the player. Each gaming machine is also responsible for utilizing the specified messaging protocol to, among other things: open and maintain communications with the game server; authenticate game clients and/or players with the server; synchronize schedules, updates, adjustments, etc. with the server; transmit relevant game activity information to the server; transmit relevant hardware information to the server; and transmit any specified accounting information to the server, such as a player login (e.g., player card ID, player code (QR, etc.), player PIN, player login, player app, NFC ID, etc.).

For instance, in one example, the pinball game client (SPGC) (e.g., gaming device 10, hereinafter referred to as SPGC 10) is the primary conduit for game client to game server (SPGS) (e.g., game server 104, hereinafter referred to as SPGS 104) communications. In this example, the SPGC 10 and SPGS 104 communications channel may be via any suitable network channel, such as via an HTTP/S Pull Model. In this model the client initiates an http query and the server provides an http response. As such, in this example the client drives all communications and the server simply responds.

Meanwhile, as noted above, the game server (SPGS 104) is the primary interface point for all administrative and data collection activities. In this example, these communications include client/server communications such as the SPGC 10 to SPGS 104 communications channel via an HTTP/S Pull Model. In this example model the client initiates an http query and the server provides an http response. As noted above, the client drives all communications and the server simply responds.

Any alarms generated by the client SPGC 10 will be disseminated by the server SPGS 104 to designated users via any standard notification protocol, including for instance, standard email and SMS messaging. Messages will flow into the system through a well-defined REST API. The messages will then be routed to a series of message handlers that act as the work horses of the system and provide some of the following services: Authentication—responsible for authenticating all users and devices attached to the system and returning the appropriate tokens for each; Device Authentication—these can be considered to be a subset of Authentication; User Authentication—these can be considered to be a subset of Authentication; Alerts—responsible for handling all alert notifications; Alarms—these can be considered to be a subset of Alerts; Audits—responsible for recording all audit information provided by the games; Configurations—responsible for maintaining and delivering all configuration information to games. Once configurations are established/updated—the handler is responsible for delivering the configuration to all relevant devices for action by that device when requested by that device; Adjustments—these can be considered to be a subset of Configurations; Game Updates—these can be considered to be a subset of Configurations. Games will be notified that updates are available and with the S3 Bucket or CDN that the update can be retrieved from; Heartbeats—responsible for insuring that all critical components remain alive and are able to communicate with the SPGS 104. This handler will receive heartbeats from all connected devices based on established. If a non-response occurs an error condition is generated, and the game is taken off line; Health Checks—responsible for the collection of game health statuses and dissemination to concerned parties for action; Location—responsible for the collection of geolocation information from the games; Logging—responsible for the management (collection and logging) of all SPG/SPGS related messages; Scheduling—responsible for management and dissemination of established schedules (downloads, updates, adjustments) to Games upon request; Session Management—responsible for the management of all game related activities as it relates to a specific game session. This includes recording the start of new sessions, ending game sessions, and retention of data for game analysis; and Time Synchronization—responsible for ensuring that server and client system times remain in sync.

Known pinball games contain a fixed set of common audits and adjustments. However, the example game client may add and/or delete audits or adjustments during any initial or subsequent release. In order to prevent changes that occur within the client software driving changes to the server—upon first boot the client will communicate the feature data definition to be communicated to the server on subsequent audit or adjustments. These example messages comprise only of those additional feature data elements and will not impact the set of known standard common audits and adjustments.

As noted, HTTP is utilized in the example message protocol. This is defined as the primary entry/exit point for all messaging originating from a SPGC 10. This channel follows the HTTP Pull model where SPGC 10 originates message requests and SPGS 104 responds to those requests. The SPGS 104 HTTP channel cannot originate requests—it can only respond to messages generated by the clients.

The server hosts all data storage via a combination of a relational database (such as for instance, PostgreSQL) and logging files. All data is maintained both in primary storage on the main server.

The example SPGS 104 implements a standard NTP service to remain in sync with a specified external NTP server. All game time synchronization is derived from the time stamps embedded in the server to game messages. This ensures that the games remain in sync with the server. The SPGC 10 uses a mechanism that closely mirrors the behavior of NTP. The process comprises: the time in the message header is extracted; the extracted time is compared to the system time, and then; if the delta between the two times exceeds a defined limit, the system time is set to match that contained within the header. Any message can be utilized but the most frequent/common is the heartbeat message framework.

Messaging

Together, FIGS. 4-36 illustrate example messaging protocols and formats used within the example system. In this example, all communications between any external client and the SPGS 104 will utilize a REST API over an HTTP transport. Further, the format for the messages is JSON encoded strings.

In this instance, all example Pinball (SP) messages are text messages and are what comprises the "body" referenced above. These bodies are inserted into the standard text body of a JMS Text Message. The messages are formatted as JSON pairs and will consist of three parts: a SP message header; a SP message body; and a SP message CRC.

The following SP Message Data Types may be used:

Base Types:

Boolean: Boolean represents a two-state value of 'True'/'False' (values are represented as 'True' or 'False' and may be converted to 'Yes'/'No' or '0'/'1' depending upon display usage.

Integer: Integer represents an unsigned number from 0 to 4,294,967,295.

Decimal: Decimal represents a numeric value with a provided precision and scale. (ex. decimal (precision, scale)). Precision says the total number of digits that can be held in the number, scale says how many of those are after the decimal place, so decimal (3,2) is a number which can be represented as #.##; decimal (5,3) would be ##.###.

String: A String comprises one to many Unicode characters.

Derived Types

Score: Score represents a special type of Integer with precision 0 and ?

Duration: Duration represents a special type of Integer expressed in milliseconds.

DateTime: DateTime represents a special type of Integer consisting of milliseconds since epoch (Jan. 1, 1970 UTC) from which full date and time information can be derived.

Price: Price represents a special type of Decimal constrained for currency value.

Initials: Initials represents a special type of String constrained to 3 letters.

Percentage: Price represents a special type of Decimal constrained to represent a percentage (ex. Decimal (3,2)).

Enumerated List: TBD

| Field | Type | Description | Required | Note |
|---|---|---|---|---|
| Number of Values | Integer | | Yes | |
| List of Value Names | List of Value-String Mappings | | Yes | |

All messages contain a standard header used for routing, timestamps, etc. The following Table (Table 3) defines the characteristics of that header.

TABLE 3

The SP message sub-header

| Field | Type | Description | Required | Note |
|---|---|---|---|---|
| messageID | Integer | Indicates the type message contained in the body. | Yes | See Message ID definitions |
| resultCode | Integer | If the message is returned as a result of a request – and as a result of that request an error was generated, then the code for that error will be included here. | Yes | See Status Codes definition |
| operatorID | Integer | Indicates the Operator ID of the operator associated with the Game generating the request | Yes | Derived from a database look up or from local game configuration |
| locationID | Integer | Indicates the Location ID where the Game resides at the time the request was generated | Yes | Derived from a database look up or from local game configuration |
| machineID | Integer | Indicates the Machine ID of the Game generating the request | Yes | Derived from a database look up or from local game configuration |
| gameID | Integer | Indicates the Game ID active on the Game at the time the request was generated | Yes | Derived from a database look up or from local game configuration |
| version | String | Indicates the version of the API being used | Yes | Client should default to latest version, if client uses previous version server should adapt |
| timestamp | Integer | The date/time the request was generated | Yes | Derived from the system clock |
| authToken | String | The Auth token generated and returned during the Authorization process | No | Derived from Auth process |

The following table (Table 4) denotes the specific message types. Contents of the payloads associated with these types follows below.

TABLE 4

| SP Message Types | | | |
|---|---|---|---|
| Type | ID | Description | Handler |
| ACK | 1 | Used as a generic acknowledgement when no message specific response is required. | com.handler.Ack |
| Adjustment | 2 | Used by the Game to request adjustments to be made | com.handler.Adjustment |
| Feature Adjustment Definition | 3 | Used by the Game to inform the Server of any new Game specific adjustments | com.handler.Adjustment |
| Adjustment Response | 4 | Used by the Server to specify adjustments to be made to the Game in response to an adjustments request | com.handler.Adjustment |
| Adjustment Applied | 5 | Used by the Game to indicate that the adjustment has been successfully applied or has failed | com.handler.Adjustment |
| Alarm | 6 | Used by the Game to indicate to the Server that an alarm condition exists | com.handler.Alarm |
| Alerts | 7 | Used by the Game to request alerts from the Server | com.handler.Alerts |
| Alerts Response | 8 | Used by the Server to send alerts to the Game in response to a request | com.handler.Alerts |
| Audit | 9 | Used by the Game to send game machine audit information | com.handler.Audit |
| Audit Definition | 10 | Used by the Game to inform the Server of any new Game specific audits | com.handler.Audit |
| Devices | 11 | Used to request a list of authorized Devices from the Server that can communicate with the Server | com.handler.Auth |
| Devices Response | 12 | Used to deliver a list of devices that have been authenticated by the Server. | com.handler.Auth |
| Device Authentication | 13 | Used by the Device to request an authorization token from the authoritative Server. | com.handler.Auth |
| Device Authentication Response | 14 | Used by the Server to deliver an authorization token if the Device is authorized. | com.handler.Auth |
| Heart Beat | 15 | Used by the Game to send a heartbeat to the Server | com.handler.Heartbeat |
| Health Check | 16 | Used by the Game to send a general status of critical game system components to the Server | com.handler.Healthcheck |
| Location | 17 | Used by the Game to send geolocation information to the Server | com.handler.Location |
| Login | 18 | Used to request a user authentication token from the server | com.handler.Auth |
| Login Response | 19 | Used to return a user authentication token in response to a user authentication request | com.handler.Auth |
| Logout | 20 | Used to log a user out of the system and terminate their session | com.handler.Auth |
| Logger | 21 | Used by the Game to log game device information on the Server. Multiple log types can be specified | com.handler.Logger |
| Logs Available | 22 | Used by the Game to notify the Server which game logs (game, operating system, or crash) are available for transfer | com.handler.Logs |
| Logs Request | 23 | Used by the Server to request game logs (game, operating system, or crash) from the Client | com.handler.Logs |
| Logs Transfer | 24 | Used by the Game to send game logs (game, operating system, or crash) to the Server | com.handler.Logs |
| Schedule | 25 | Used by the Game to request scheduling information from the Server | com.handler.Schedule |
| Schedule Response | 26 | Used by the Server to return relevant scheduling information to the Game | com.handler.Schedule |
| Server Time | 27 | Used by the Game to request the current time from the Server | com.handler.ServerTime |
| Server Time Response | 28 | Used by the Server to return the current Server time to the Game | com.handler.ServerTime |
| Session Begin | 29 | Used by the Game to send a Game session start to the Server | com.handler.SessionBegin |
| Session Update | 30 | Used by the Game to send an update an existing game session to the Server | com.handler.SessionUpdate |

TABLE 4-continued

SP Message Types

| Type | ID | Description | Handler |
|---|---|---|---|
| Session End | 31 | Used by the Game to send a Game session end for an existing game session to the Server. | com.handler.SessionEnd |
| Version | 32 | Used by the Game to send the firmware/software version to the Server | com.handler.Version |
| Version Updates Available | 33 | Used by the Game to send a request for game upgrade information to the server | com.handler.VersionUpdate |
| Version Updates Response | 34 | Used by the Server to send a list of new software/firmware versions that the client can download and install | com.handler.VersionUpdate |

TABLE 5

The SP message CRC

| Field | Type | Description | Required | Note |
|---|---|---|---|---|
| CRC | Integer | Indicates the size of the entire message (SP Header and Body). Used in message verification to ensure that the message size of the received message is the same as what was sent. | Yes | |

Figure 5:
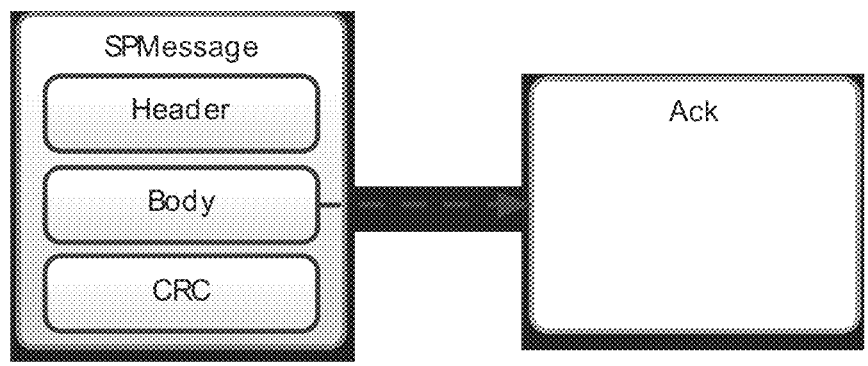
FIG. 5 is an example acknowledgment message.

FIG. 5 illustrates an example ACK message returned as a "generic" response to all message requests that specify an acknowledgement reply only (i.e. no specific actionable data is expected to be returned). In these specific cases the ACK will suffice as a response with the ResultCode set to indicate the SUCCESS or FAILURE of the request.

Figure 6:
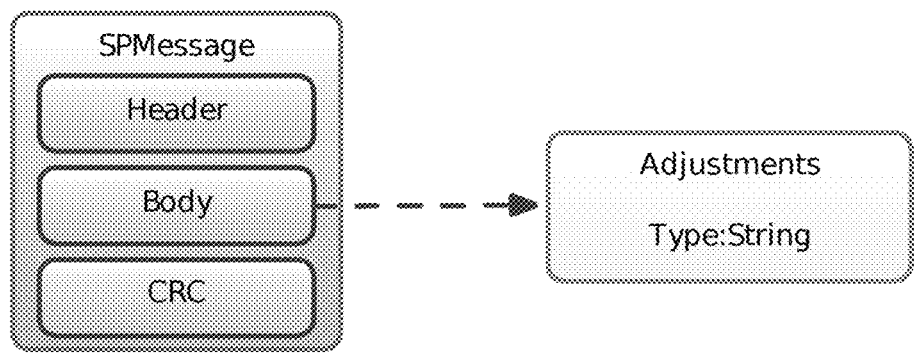
FIG. 6 is an example feature adjustment definition message.

FIG. 6 illustrates an example Feature Adjustment Definition message generated by the game to inform the Server of any additional adjustment values that are specific to the game.

| Field | Type | Description | Required | Note |
|---|---|---|---|---|
| tableName | String | The name of the group of adjustments | Yes | This will be used as the display name for this set of adjustments on the server web portal |
| adjustmentList | List | List of Adjustments | Yes | |

Feature Adjustment List Definition

| Field | Type | Description | Required | Note |
|---|---|---|---|---|
| adjustmentName | String | The name of the adjustment | Yes | |
| description | String | Description of adjustment | Yes | Will be displayed to the user in the server web portal |
| dataType | Supported Data Type | The data type of the adjustment | Yes | |
| maxValue | Supported Data Type | Maximum value allowed | No | |
| minValue | Supported Data Type | Minimum value allowed | No | |
| defaultValue | Supported Data Type | Default value | Yes | |

Figure 7:
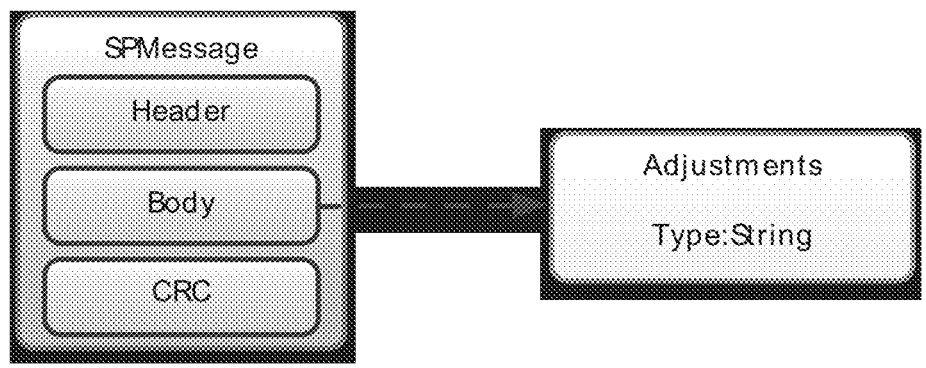
FIG. 7 is an example adjustments message.

FIG. 7 illustrates another example Adjustments message generated by the Game to request any pending Adjustments currently residing on the Server specific to that Game.

| Field | Type | Description | Required | Note |
|---|---|---|---|---|
| tableName | String | Indicated a list of adjustments to be returned | No | If no value is provided, all adjustments will be sent in server response to game |
| adjustmentName | String | Indicates a specific adjustment | No | If no value is provided all adjustments in table will be sent in server response |

Figure 8:
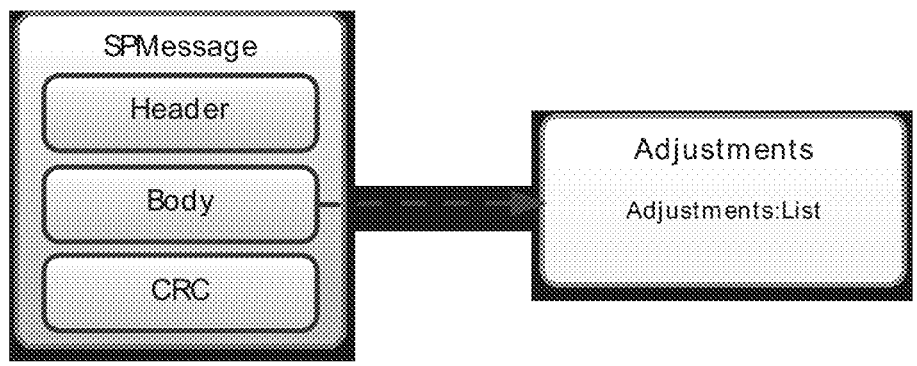
FIG. 8 is an example adjustments response message.

FIG. 8 illustrates an example Adjustments Response message generated when the configurable items are requested by the Game. The items contained within this message are those that are specific to that Game. This message can also be independently generated by the Game to reflect changes made directly at the Game and forwarded to the Server for historical purposes.

| Field | Type | Description | Required | Note |
|---|---|---|---|---|
| applied | Boolean | Indicates if the adjustments have been applied to the Game | Yes | True |
| tableList | String | | Yes | |
| adjustmentList | List | List of adjustments in table | Yes | |

Figure 9:
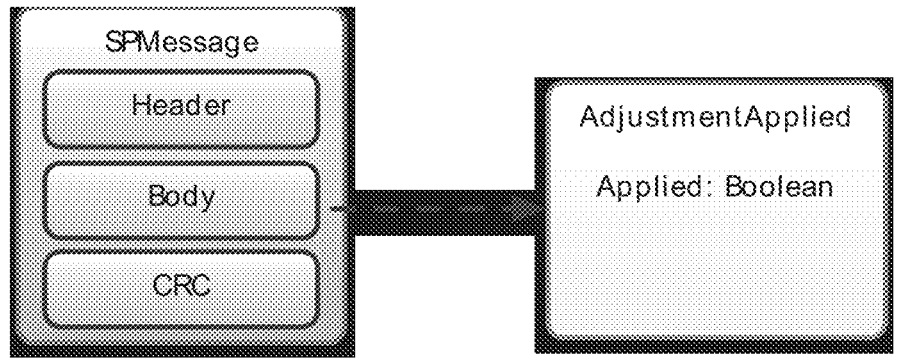
FIG. 9 is an example adjustments applied message.

FIG. 9 illustrates an example Adjustment Applied message generated by the Game to indicate to the Server that the specified Adjustments to the Game have been applied. The receipt is acknowledged with a standard ACK message.

| Field | Type | Description | Required | Note |
|---|---|---|---|---|
| applied | Boolean | Indicates to the Server that the Adjustments to the Game have been applied. | Yes | False |

Figure 10:
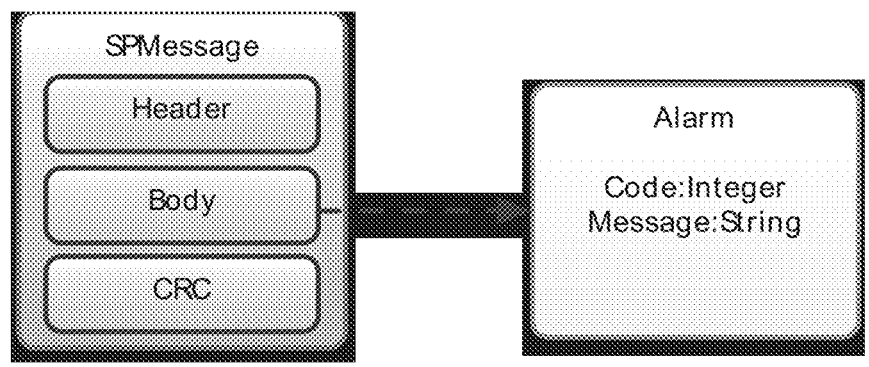
FIG. 10 is an example alarm message.

FIG. 10 illustrates an example Alarm message generated in response to a failure condition on the game or the server. The Result Code contains the numerical code that reflects what the error was, and the Message is a text string that can be used to log the error, display a message to the user, etc. If it is a Game generated Alarm message, the condition is logged on the server and the remaining Games are allowed to continue on and play under normal circumstances. If it is a Server generated Alarm message, if possible, the condition is logged on the server, the alarm is disseminated to all games, and the games will continue playing under restricted conditions until the server recovers. The Alarm will be disseminated by the Server to designated users via standard Email and/or SMS. The receipt is acknowledged with a standard ACK message.

| Field | Type | Description | Required | Note |
|---|---|---|---|---|
| code | Integer | The ResultCode corresponding to the Alarm code. | Yes | Should correlate to values for Alarms found in Status Codes definition |
| message | String | A message corresponding to the ResultCode to be used for display purposes only | Yes | Should correlate to values for Alarms found in Status Codes definition |

Figure 11:
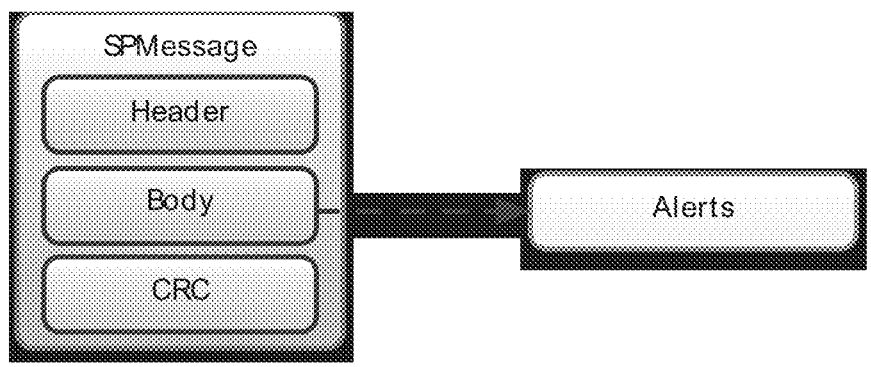
FIG. 11 is an example alerts message.

FIG. 11 illustrates an example Alerts message generated by the Game in order to request Alerts that may be present and awaiting delivery on the server.

| Field | Type | Description | Required | Note |
|---|---|---|---|---|
| No additional data required message | | | | |

Figure 12:
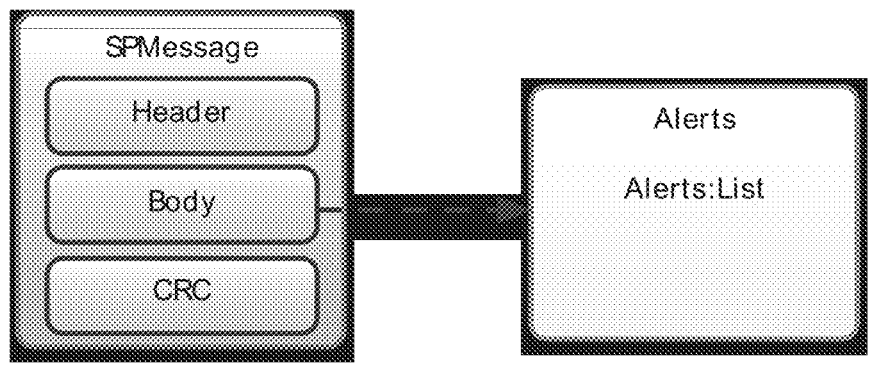
FIG. 12 is an example alerts response message.

FIG. 12 illustrates an example Alerts Response message generated by the Server in response a Game request for pending Alerts that may be present and awaiting delivery to the game. The Result Code contains the numerical code that reflects what the alert was, and the Message is a text string that can be used to log the error, display a message to the user, etc.

| Field | Type | Description | Required | Note |
|---|---|---|---|---|
| code | Integer | The ResultCode corresponding to the Alert code. | Yes | Should correlate to values for Alerts found in Result Codes definition |
| message | String | A message corresponding to the ResultCode to be used for display purposes only | Yes | Should correlate to values found in Result Codes definition |

Figure 13:
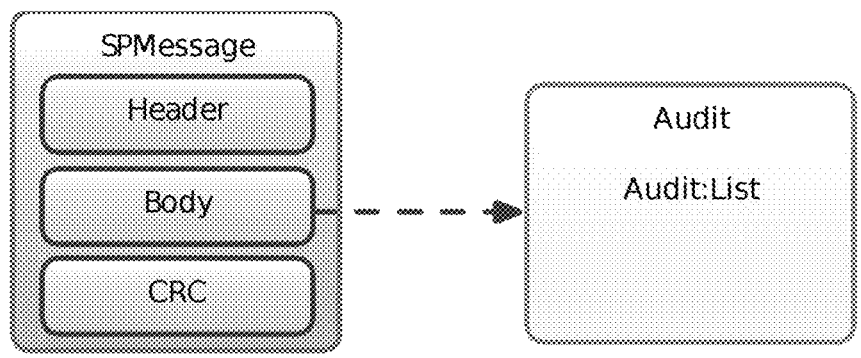
FIG. 13 is an example audit definition message.

FIG. 13 illustrates an example Audit Definition message generated by the Game to inform the Server of any additional audit values that are specific to the Game.

| Field | Type | Description | Required | Note |
|---|---|---|---|---|
| tableName | String | The name of the group of audits | Yes | This will be used as the display name for this set of audits on the server web portal |
| auditList | List | List of Audits | Yes | |

| Field | Type | Description | Required | Note |
|---|---|---|---|---|
| auditName | String | The name of the audit | Yes | |
| description | String | Description of the audit | Yes | Will be displayed to user in the server web portal |
| dataType | Supported Data Type | The data type of the audit | Yes | |
| resetFromServer | Boolean | Yes/No | No | |

Figure 14:
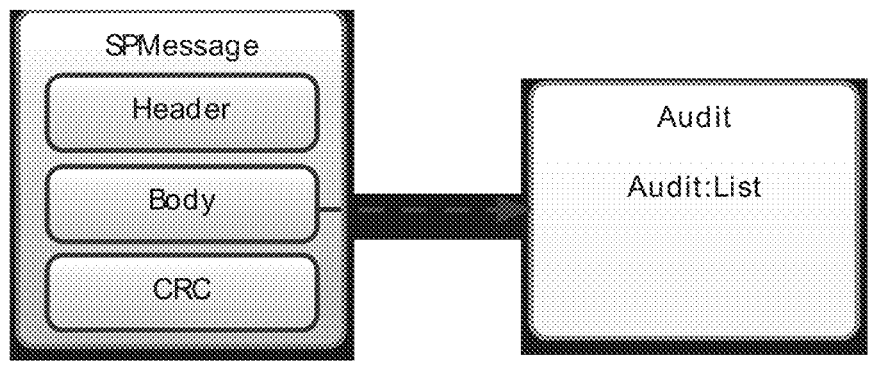
FIG. 14 is an example audit message.

FIG. 14 illustrates an example Audit message generated by the Game and sent to the Server to periodically update the Server with Game data. The receipt is acknowledged with a standard ACK message.

| Field | Type | Description | Required | Note |
|---|---|---|---|---|
| tableList | String | List of tables | Yes | |
| auditList | List | List of audit values for a table | Yes | |

Figure 15:
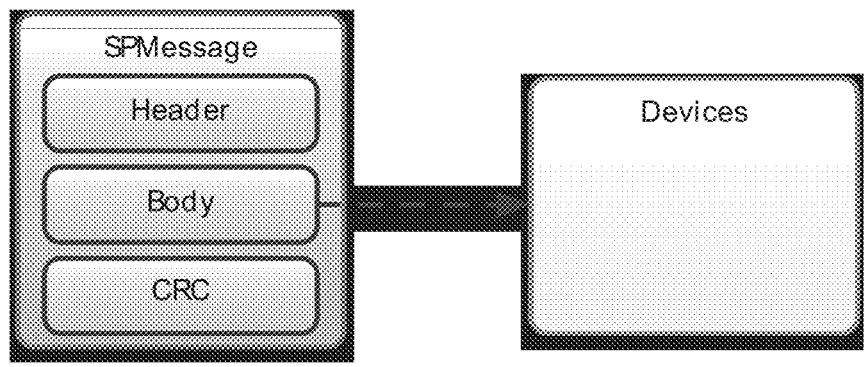
FIG. 15 is an example devices message.

FIG. 15 illustrates an example Devices message is primarily generated by the Server with the primary recipient being the Authentication Service. The purpose is to request a list of machines authorized to communicate with the system. The Authentication service will respond with a Device Authentication List.

| Field | Type | Description | Required | Note |
|---|---|---|---|---|
| | | No additional data required | | |

Figure 16:
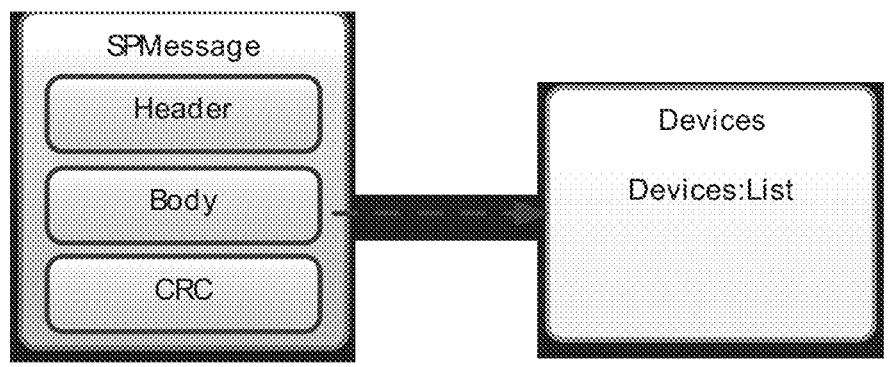
FIG. 16 is an example devices response message.

FIG. 16 illustrates an example Devices Response message generated by the Authentication Service in response to a Machines message request generated primarily by the Unity Game Server. The intent is to provide the UGS with a list of game machine clients that have been authenticated to communicate with the system.

The following information will be returned to the requestor: Machine ID; MAC Address; and IP Address.

| Field | Type | Description | Required | Note |
|---|---|---|---|---|
| authenticatedDevices | List | Provides the identification characteristics of all authenticated clients. | Yes | Information returned: machineId: The ID used to uniquely identify the device macAddress: The MAC address of the authenticated device ipAddress: The IP address of the authenticated device type: The device type (game, server, mobile) |

Figure 17:
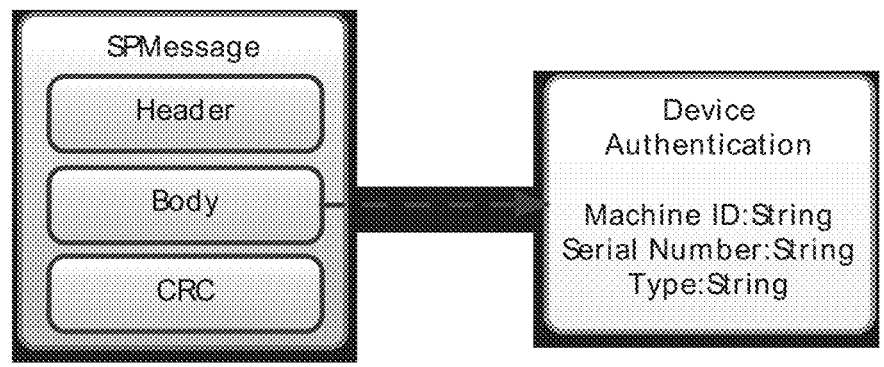
FIG. 17 is an example device authentication message.

FIG. 17 illustrates an example Device Authentication message generated by each Device as it comes online and attempts to communicate with the system server. The message contains identifying information such as: Machine ID; and Serial Number. In addition, the following information derived from a system call: MAC Address; and IP Address.

| Field | Type | Description | Required | Note |
|---|---|---|---|---|
| machineID | String | Indicates the machine ID of the device | Yes | |
| serialNumber | String | Indicates the serial number of the Device | Yes | |
| type | String | Indicates the type of Device | Yes | Game, Server, or Mobile |

Figure 18:
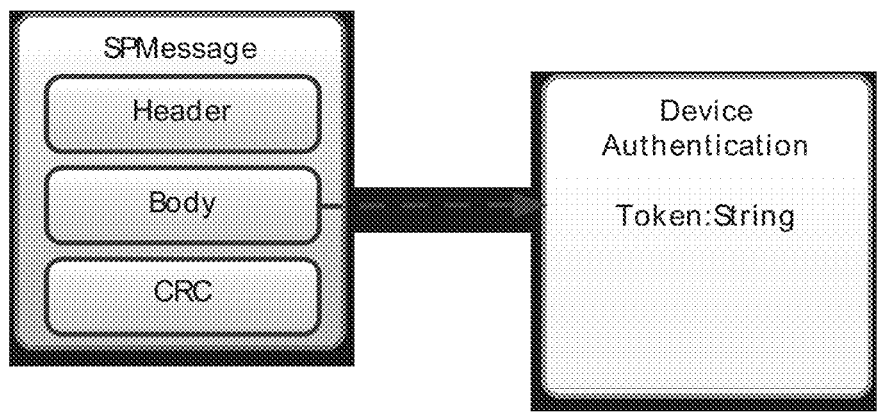
FIG. 18 is an example device authentication response message.

FIG. 18 illustrates an example Device Authentication Response message generated by the Server is response to a Device Authentication message. If the authentication service finds the provided Machine ID in the database—a Device Authentication Response message is returned with a valid authentication token. If the machine cannot be found, then the Device Authentication Response is sent with the Result-Code set to MACHINE_NOT_IN_DB and Machine ID set to FAILURE.

| Field | Type | Description | Required | Note |
|---|---|---|---|---|
| token | String | A server generated authentication token | Yes | |

Figure 19:
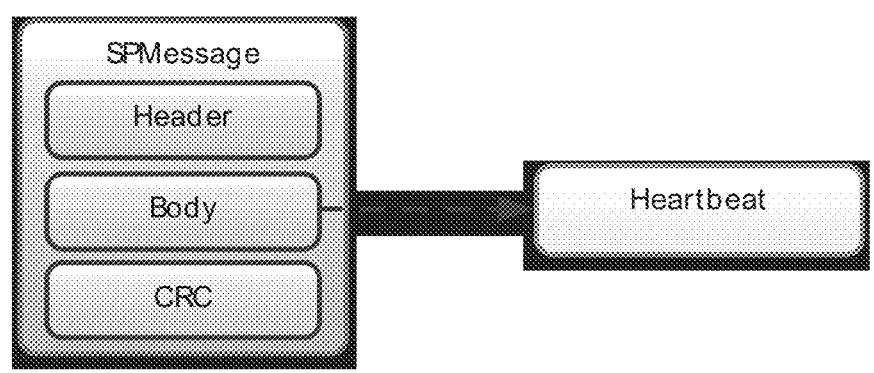
FIG. 19 is an example heartbeat message.

FIG. 19 illustrates an example Heartbeat message generated by the Game service at a rate specified in the Game Adjustments message. The receipt is acknowledged with a standard ACK message. If an ACK message is not received, the Game will reissue a Heartbeat and if a receipt is still not received the Server will be flagged as being offline.

| Field | Type | Description | Required | Note |
|---|---|---|---|---|
| | | No additional data required | | |

Figure 20:
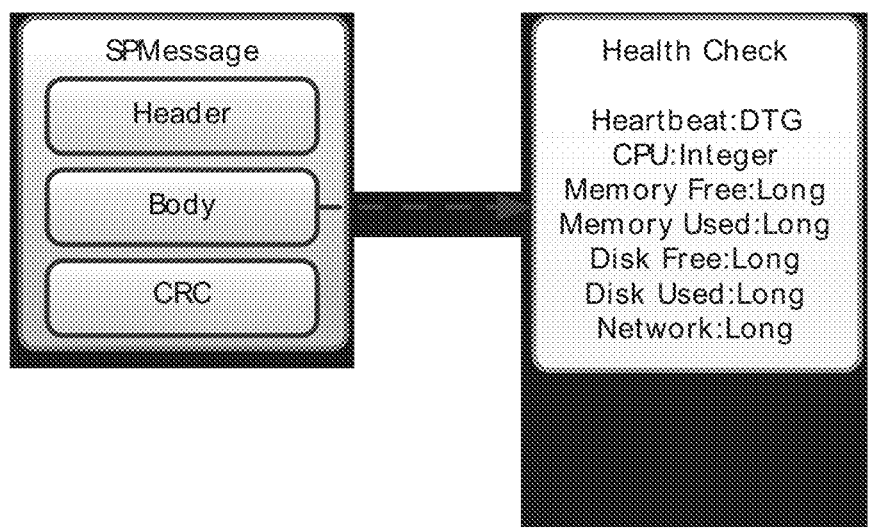
FIG. 20 is an example health check message.

FIG. 20 illustrates an example Health Check message generated by the Game to periodically notify the server of conditions. The message contains the DTG of the last heartbeat from all relevant services, games, etc. The response will also contain relevant System information such as server CPU utilization and memory utilization—as well as version information when available. The receipt is acknowledged with a standard ACK message.

| Field | Type | Description | Required | Note |
|---|---|---|---|---|
| heartbeat | DTG | Last heartbeat DTG | Yes | |
| cpu | Integer | CPU utilization percentages | Yes | Derived from system call |
| memoryFree | Long | Amount of free memory | Yes | Derived from system call |
| memoryUsed | Long | Amount of used memory | Yes | Derived from system call |
| diskFree | Long | Amount of disk free | Yes | Derived from system call |
| diskUsed | Long | Amount of disk used | Yes | Derived from system call |
| network | Long | Amount of network utilized | Yes | Derived from system call |

Figure 21:
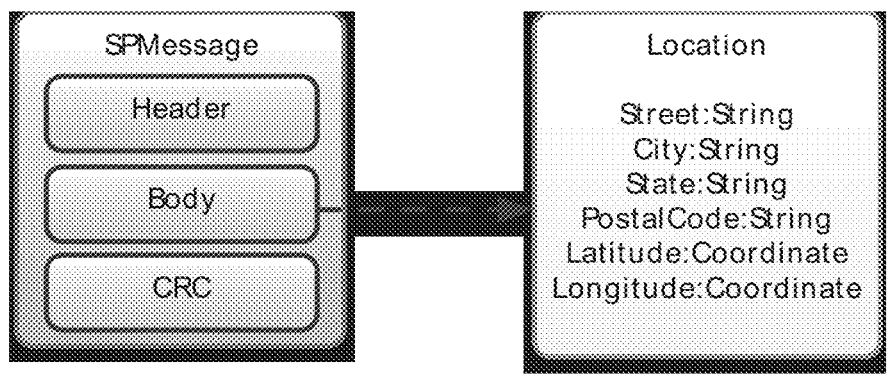
FIG. 21 is an example location message.

FIG. 21 illustrates an example Location message generated by the Game to notify the server of its physical location. The message contains the physical location entered by the operator (when available) and the coordinate data (if able to be obtained by a geo-lookup of the IP. The receipt is acknowledged with a standard ACK message.

| Field | Type | Description | Required | Note |
|---|---|---|---|---|
| Street | String | Physical street address | No | |
| City | String | Physical city | No | |
| State | String | Physical state | No | |
| postalCode | String | Physical postal code | No | |
| Latitude | Coordinate | Coordinates | No | Derived from system call |
| Longitude | Coordinate | Coordinates | No | Derived from system call |

Figure 22:
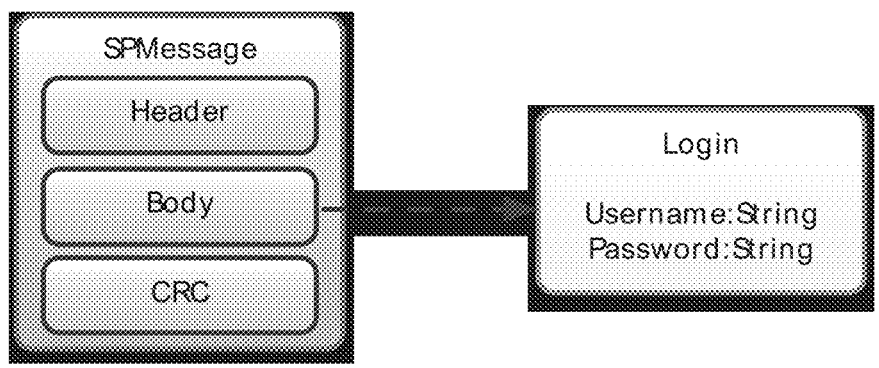
FIG. 22 is an example login message.

FIG. 22 illustrates an example Login message used by various system components to authenticate a user with the system and return by an authentication token. The receipt is acknowledged with a Login Response message.

| Field | Type | Description | Required | Note |
|---|---|---|---|---|
| Username | String | The username of the person or entity attempting to authenticate | Yes | |
| Password | String | The password of the person or entity attempting to authenticate | Yes | |

Figure 23:
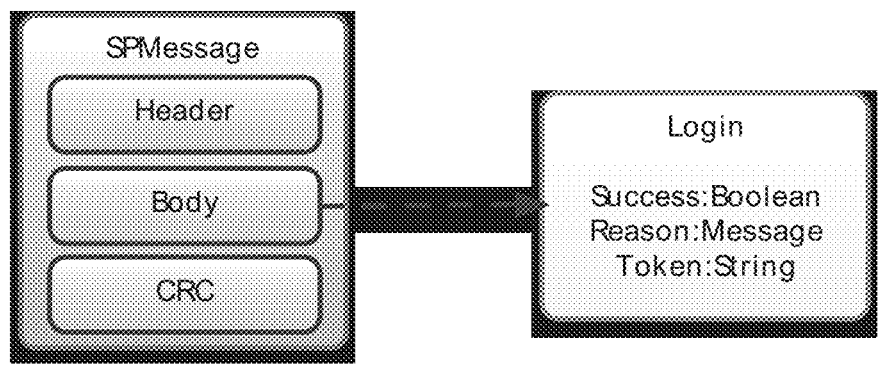
FIG. 23 is an example login response message.

FIG. 23 illustrates an example Login Response message returned by the Server in response to a Login message and contains an Authentication token if the user could be authenticated. If the user could not be authenticated, then the Success flag will be set appropriately, and a reason/message will be provided that can be displayed to the user. The receipt is acknowledged with a standard ACK message.

| Field | Type | Description | Required | Note |
|---|---|---|---|---|
| Success | Boolean | A flag indicating success or failure | Yes | |
| Reason | String | A message to be displayed to the user indicating why a failure occurred | Yes | |
| Token | String | A server generated authentication token | Yes | |

Figure 24:
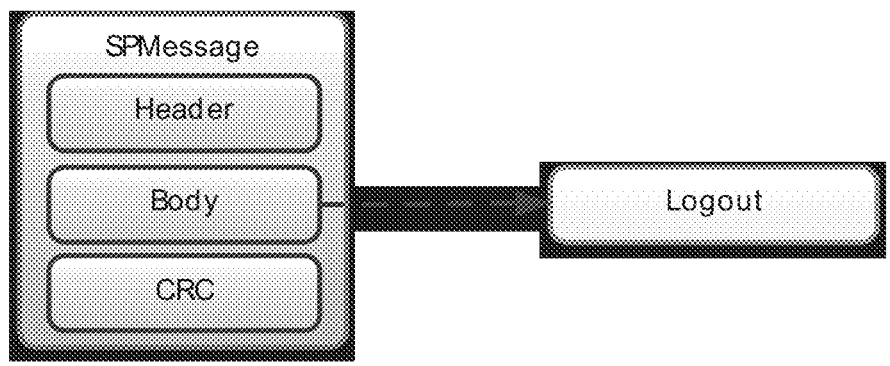
FIG. 24 is an example logout message.

FIG. 24 illustrates an example Logout message generated by various system components and used to indicate that the user session has been terminated and should be closed out. The receipt is acknowledged with a standard ACK message.

| Field | Type | Description | Required | Note |
|---|---|---|---|---|
| | | No additional data required | | |

Figure 25:
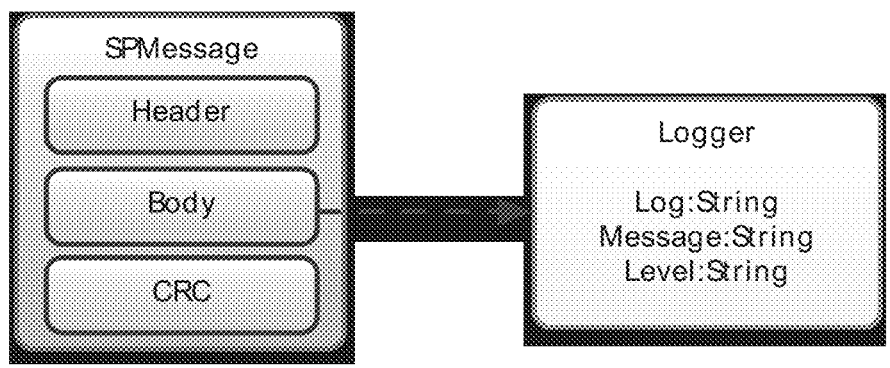
FIG. 25 is an example logger message.

FIG. 25 illustrates an example Logger message generated by the Game and used to log messages on the server for analysis by Stern systems personnel. The message contains the log name (generally the application or module name), the message to be logged, and the severity level. The receipt is acknowledged with a standard ACK message.

| Field | Type | Description | Required | Note |
|---|---|---|---|---|
| Log | String | The log file designator | Yes | |
| Message | String | The message to be logged | Yes | |
| Level | String | The severity level of the log message | Yes | WARN, ERROR. INFO, DEBUG |

Figure 26:
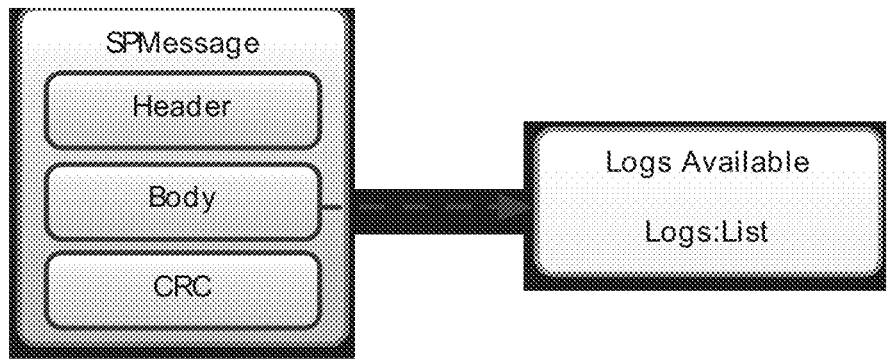
FIG. 26 is an example logs available message.

FIG. 26 illustrates an example Logs Available message generated by the Game and used to notify the Server what logs are available for transfer. The message contains the fully qualified log file name ('/var/log/syslog', '/var/log/messages', '/var/log/system.log', etc.). The receipt is acknowledged with Logs Request message.

| Field | Type | Description | Required | Note |
|---|---|---|---|---|
| logName | String | The FQN of the file | Yes | |
| Type | String | The type of log | Yes | System or Crash |

Figure 27:
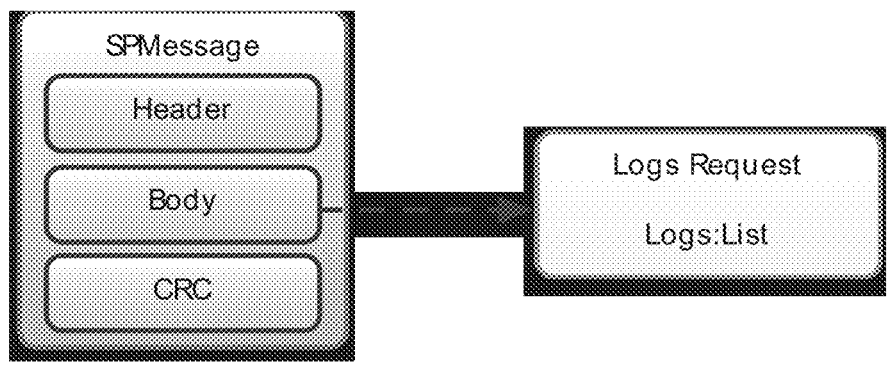
FIG. 27 is an example logs request message.

FIG. 27 illustrates an example Logs Request message generated by the Server in response to a Client Logs Available message and used to indicate to the Client which logs to transfer. The message contains the fully qualified log file name ('/var/log/syslog', 'var/log/messages', '/var/log/system.log', etc.). The receipt is acknowledged with a standard Logs Transfer message.

| Field | Type | Description | Required | Note |
|---|---|---|---|---|
| logName | String | The FQN of the file | Yes | |
| Type | String | The type of log | Yes | System or Crash |

Figure 28:
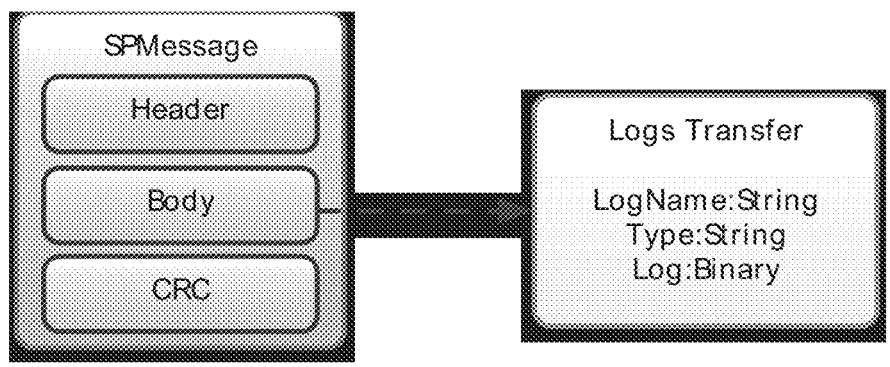
FIG. 28 is an example logs transfer message.

FIG. 28 illustrates an example Logs Transfer message generated by the Game and used to transfer entire log files from the Game to the Server for long term retention, analysis, etc. The message contains the fully qualified log file name ('/var/log/syslog', 'var/log/messages', '/var/log/system.log', etc.) and a compressed version of the log. The receipt is acknowledged with a standard ACK message.

| Field | Type | Description | Required | Note |
|---|---|---|---|---|
| logName | String | The FQN of the file | Yes | |
| Type | String | The type of log | Yes | System or Crash |
| Log | Binary | A compressed copy of the log | Yes | |

Figure 29:
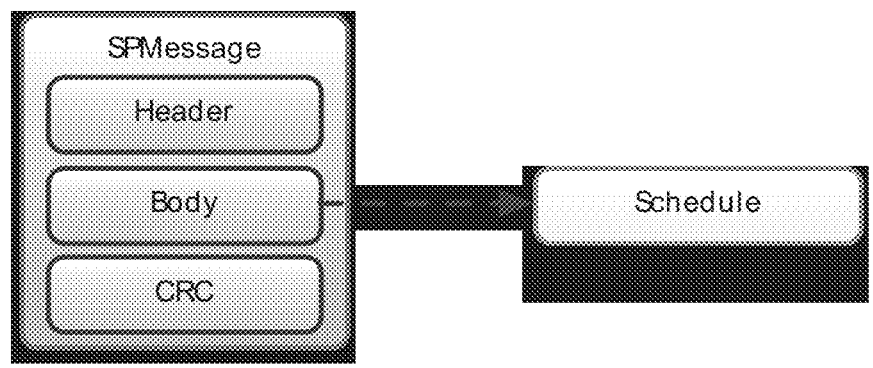
FIG. 29 is an example schedule message.

FIG. 29 illustrates an example Schedule message generated by the Game and used to request an established communication "schedule" from the server. This schedule determines the frequency that the Game will initiate communications with the Server.

| Field | Type | Description | Required | Note |
|---|---|---|---|---|
| | | No additional data required | | |

Figure 30:
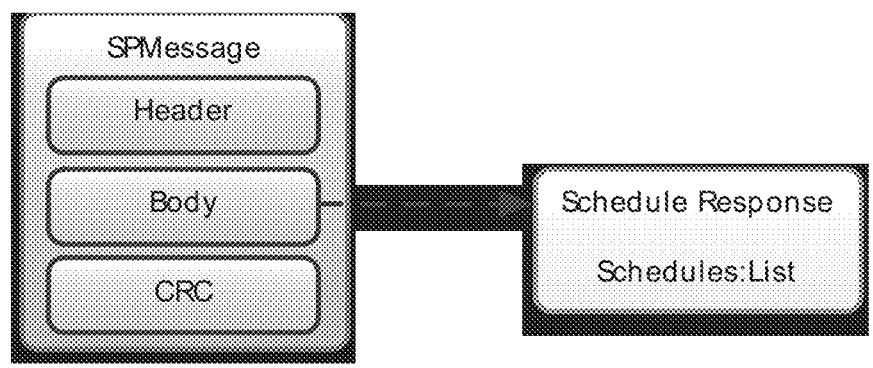
FIG. 30 is an example schedule response message.

FIG. 30 illustrates an example Schedule Response message generated by the Server in response to a Game Schedule request message. A list of "Schedules" will be returned to the Game and will be returned using the standard crontab format. Each downloaded Schedule will overwrite the previous schedule and will become the master. Once downloaded, the Client will execute the defined task schedule using the frequencies specified

| Field | Type | Description | Required | Note |
|---|---|---|---|---|
| scheduleEntry | String | A crontab formatted entry | Yes | |

Figure 31:
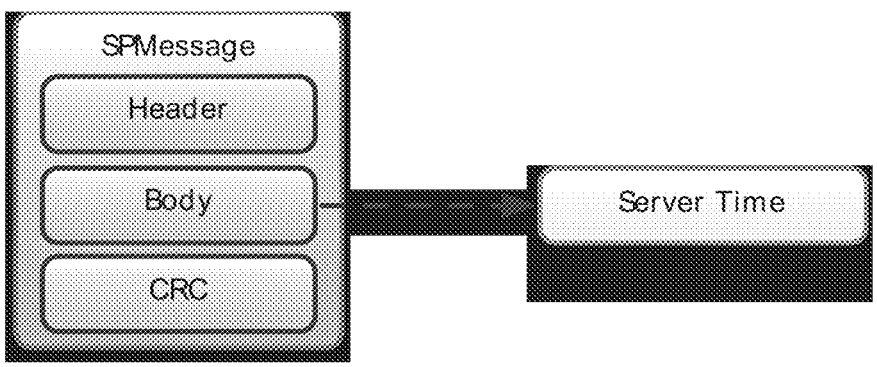
FIG. 31 is an example server time message.

FIG. 31 illustrates an example Server Time message generated by the Game and used to request the current time from the server for synchronization purposes.

| Field | Type | Description | Required | Note |
|---|---|---|---|---|
| | | No additional data required | | |

Figure 32:
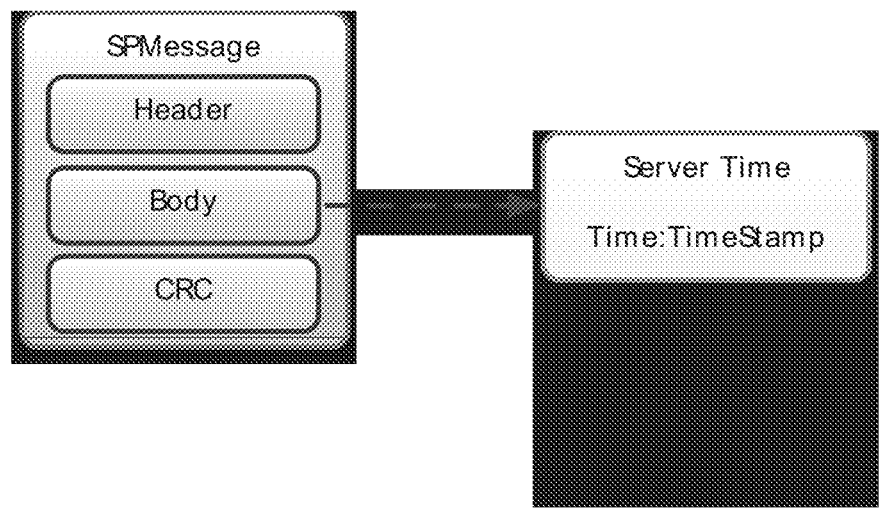
FIG. 32 is an example server time response message.

FIG. 32 illustrates an example Server Time Response message generated by the Server in response to a Game Server Time request. The Game retrieves the time included in the message and (if necessary) synchronize its clock to that of the server.

| Field | Type | Description | Required | Note |
|---|---|---|---|---|
| Time | timestamp | Number of milliseconds since epoch | Yes | |

Figure 33:
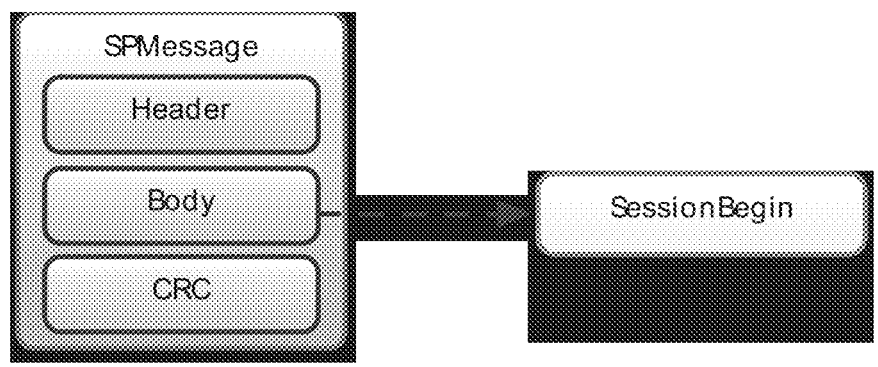
FIG. 33 is an example session begin message.

FIG. 33 illustrates an example Session Begin used by the Game to signal that a new game session has begun. The receipt is acknowledged with a standard ACK message. The ACK message will be returned with a Session ID in the ResultCode.

| Field | Type | Description | Required | Note |
|---|---|---|---|---|
| | | No additional data required | | |

Figure 34:
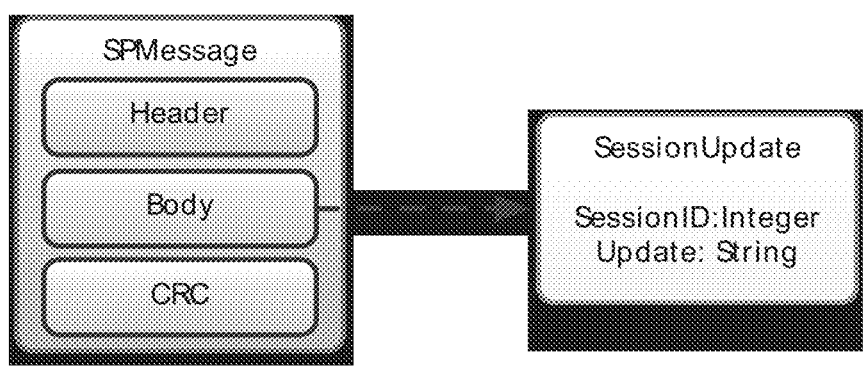
FIG. 34 is an example session update message.

FIG. 34 illustrates an example Session Update message is sent from the Game to update the server with any relevant information. The receipt is acknowledged with a standard ACK message.

| Field | Type | Description | Required | Note |
|---|---|---|---|---|
| sessionID | Integer | A unique key used to identify the session to be updated | Yes | Generated by the Session Service in response to a Session Begin message. |
| Update | String | A field used to specify a TBD status update | Yes | |

Figure 35:
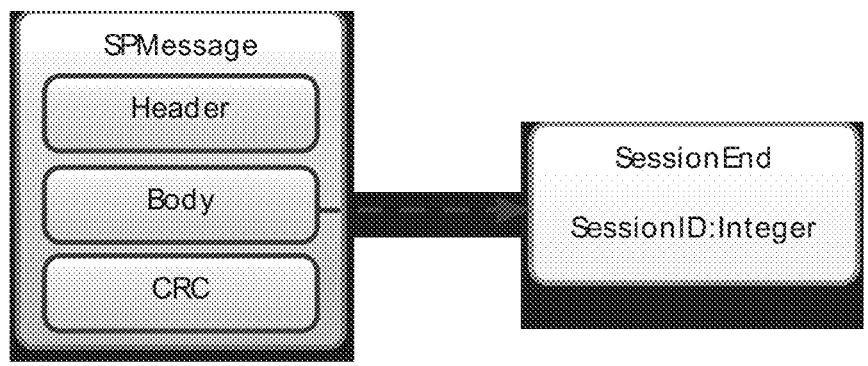
FIG. 35 is an example session end message.

FIG. 35 illustrates an example Session End that is sent by the Game to signal that the game has been completed and that the session can be closed out. The receipt is acknowledged with a standard ACK message.

| Field | Type | Description | Required | Note |
|---|---|---|---|---|
| sessionID | Integer | A unique key used to identify the session to be updated | Yes | Generated by the Session Service in response to a Session Begin message. |

Figure 36:
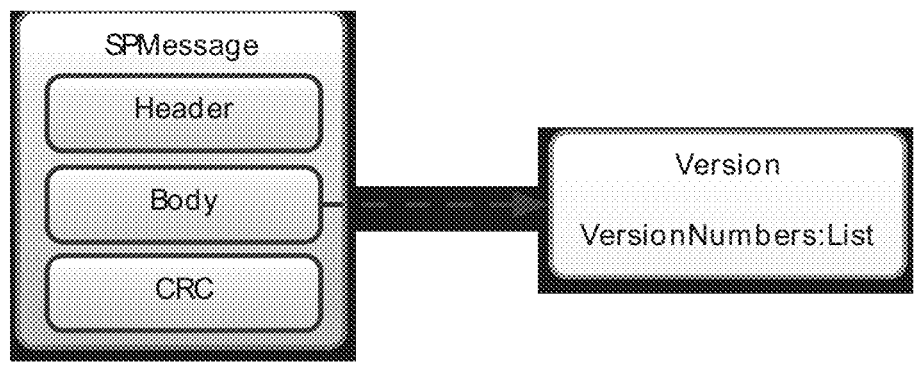
FIG. 36 is an example version message.

FIG. 36 illustrates an example Version message generated by the Game to provide the current software/firmware versions to the Server for retention. The receipt is acknowledged with a standard ACK message.

| Field | Type | Description | Required | Note |
|---|---|---|---|---|
| versionNumber | String | The current game software/firmware version numbers | Yes | |

Figure 37:
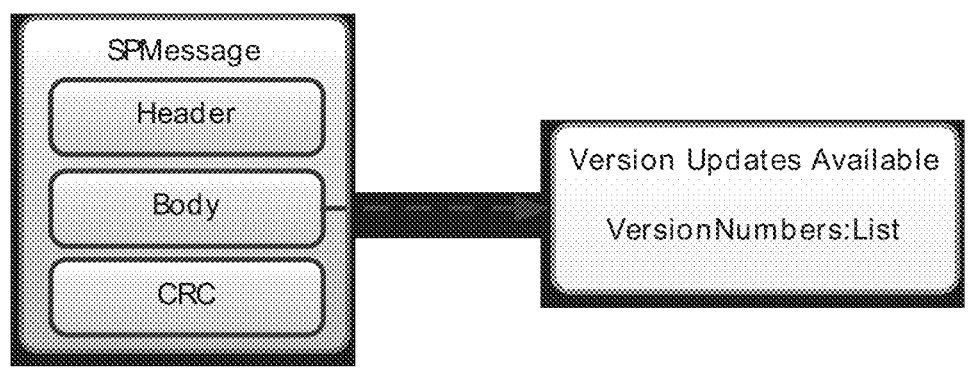
FIG. 37 is an example version update available message.

FIG. 37 illustrates an example Version Updates Available message generated by the Game to request update information for all software/firmware versions installed on the Game. The receipt is acknowledged with a Version Updates Response message.

| Field | Type | Description | Required | Note |
|---|---|---|---|---|
| versionNumber | String | The current game software/firmware version numbers | Yes | |

Figure 38:
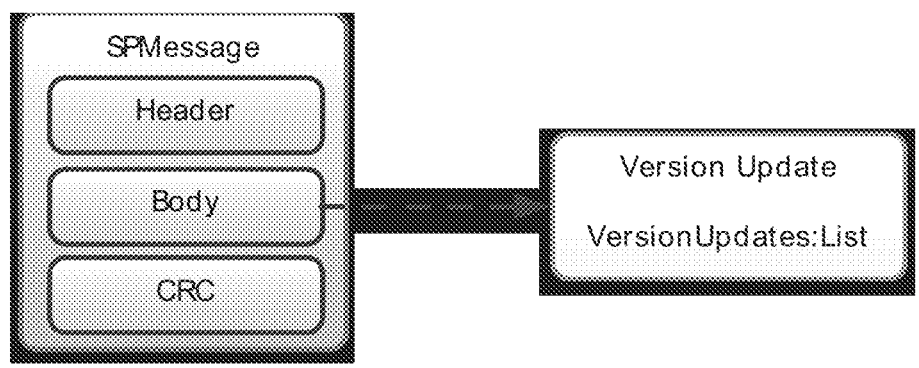
FIG. 38 is an example version update response message.

FIG. 38 illustrates an example Version Update Response message generated by the Server in response to a Game Version Updates Available request. If available, the message contains new version number information as well game manifest information detailing the various game components, and CDN locations for retrieval. The receipt is acknowledged with a standard ACK message.

| Field | Type | Description | Required | Note |
|---|---|---|---|---|
| versionNumber | String | The current game software/firmware version numbers | Yes | |
| Manifest | List | A list of game assets along with meta data (type, size, version, location, etc.) | Yes | |
| cdnServer | String | Address of cdn server to get updates from | Yes | Should contain fully qualified name (FQN) and path to file(s) |

Web Portal User Interface

Server administration is performed via a standard web portal application. In general, all information displayed is filtered based on the user's organizational association. For instance, a user may be assigned to at least one of the following organizations: User A belongs to the corporate organization; User B belongs to Red Organization; User C belongs to Blue Organization; User D belongs to Green Organization; and User E belongs to Red and Blue Organizations. As a result, the respective user can see the following information: User A can see Corporate, Red, Blue, and Green Organizational assets (people, machines, games, . . . ); User B can see Red Organizational assets (people, machines, games, . . . ); User C can see Blue Organizational assets (people, machines, games, . . . ); User D can see Green Organizational assets (people, machines, games, . . . ); User E can see Red and Blue Organizational assets (people, machines, games, . . . ). The ability of a user to either simply view or to be able to add, delete, modify will be in accordance with the role assigned to that user.

It will be appreciated that roles may vary page by page. For instance, example roles may include: Login—Allow the end user to log in to the web portal; Logout—Allow the end user to log out of the web portal; Dashboard—Display a dashboard the summarizes key factors about the system; Operator Management—Allow for the creation and management of key organizational data elements; User Management—Allow the administrative user to manage users (invite, add, reset passwords, modify, delete, disable); Change User Password—Allow the end user (or admin user) to change the user's password; Reset Password—Allow the end user (or admin user) to reset the user's password; User Profile—Allow the end user (or admin user) to change the user's profile information; User Roles and Responsibilities Assignments—Allow the admin user to assign the roles to a user and make associations to pages; Roles and Responsibilities Definitions—Allow the admin user to create roles and responsibilities; View Notifications—Allow the end user to view notifications; Manage Notifications—Allow the admin user to view/modify what notifications are delivered; View Alarms—Allow the end user to view alarms; Manage Alarms—Allow the admin user to view/create/modify alarms; View Alerts—Allow the end user to view alerts; Manage Alerts—Allow the admin user to view/create/modify alerts; View Game Client Configuration—Allow the end user to view game client configurations; Manage Game Client Configuration—Allow the admin user to view/create/modify game client configurations; Manage Server Configuration—Allow the admin user to view/create/modify server configurations; View Machines—Allow the end user to view key machine information; Manage Machines—Allow the admin user to view/create/modify key machine information; View Machine Data Collection—Allow the end user to view key collected machine data; View Games—Allow the end user to view key game information; Manage Games—Allow the admin user to view/create/modify key game information; View Game Versioning—Allow the end user to view key game versioning information; Manage Game Versioning—Allow the admin user to view/create/modify key game versioning information; View Game Activity Data Collection—Allow the end user to view key game activity information; View Adjustments—Allow the end user to view key game adjustments; Manage Adjustments—Allow the admin user to view/create/modify key game adjustments; View Audits—Allow the end user to view key game audits; Manage Audits—Allow the admin user to view/create/modify key game audits; View Schedules—Allow the end user to view key schedule information; Manage Schedules—Allow the admin user to view/create/modify key schedule information; View Game Log Files (Generated)—Allow the end user to view generated game log files; View Game Log Files (Transferred)—Allow the end user to view transferred game log files; and Server Log Files—Allow the end user to view generated server log files.

In operation, the example network, SPI Online Connectivity system, provides the necessary components required to establish an ecosystem that will enhance all aspects of the relationship between the pinball machine manufacturer and the customers. The system and data creates tools that help operators improve their business and build a direct connection with home users. The data collected across the installed base of machines additionally provides insights that will benefit the manufacturer's operations, quality, service, innovation, and engineering teams.

The system provides both the client and server infrastructure components necessary to connect remotely deployed pinball machines to a centralized cloud based server infrastructure for at least the purpose of: remote software/firmware updates; remote configuration updates; device health/status monitoring; data collection; communications between the pinball manufacturer and operator/at-home users; and tools/processes (to include DevOps automation tools) necessary to support a cloud-based deployment.

To implement the noted networked system, the components may be installed on any suitable newly manufactured machine at the factory, or the components may be made available via a connectivity kit that allows an operator to connect an existing pinball machine to any suitable internet service to register the client machine with the server.

In the example disclosed, there are generally two types of network communications that may be implemented in a web-based architecture: HTTP Pull Model or Web Sockets. With regard to HTTP Pull Model, in this model the client initiates an http query and the server provides an http response. The client drives all communications and the server simply responds. This has the benefit of constraining communications to a less chatty model thus potentially minimizing bandwidth usage and processing power needed by the server. It fits well with the "on-demand" deployment model discussed above whereas the game machine is not always on the network.

Regarding Web Sockets, there is established a persistent connection. Though still existing with an established HTTP communication channel—this differs in that once established by the client this channel can be used for bi-directional communication in that either client or server can initiate a query. As such, real time communications can be established. Further, servers can independently send information to or request information from clients without having to wait for client initiation. Therefore, monitoring, status checks, and alerts are greatly enhanced.

In the case of an on-demand connection, the client component is required to initiate the communications connection with the server. Once a connection is established—the game machine will initialize the channel and start the established sequence to register and authenticate. Once self-registration has been completed, necessary configuration information is exchanged to establish schedules for future connections, data exchanges, updates, etc. The server, however, will have no knowledge of the deployed clients until such time as the client initiates the connection and registers itself with the server.

Player Focused Connectivity

With the example networked gaming system, player interactions based on connectivity takes place at the games, on an app, and on any web-based portal. The disclosed player access portal exists both as a function of web access and a phone app. The app is the gateway to a variety of "at game" events and all environments, while increasing player satisfaction and enjoyment, can facilitate revenue generating features. Some example features include: player recognition; DLC (DownLoadable Content); cooperative play; cross platform play; merit badges and high score tables; frequent player programs; facilitation of tournament related interaction; specialized events; game locations; and find-a-friend functionality.

With regard to player recognition, in one example, the player may be provided with a personal ID, such as a QR code or other suitable identifier. The pinball machine includes the ability to recognize the personal ID (via a camera, scanner, etc.) to allow the client to recognize the player and provide persistence in gaming. Additional features may include: The ability to pay for games or DLC; provide access to subscription services/content; and/or to adjust the difficulty of the game per user preferences, such as "easy, medium, hard" difficulty; minimum play time; tournament mode; volume; game specific rules and/or configurations.

The DLC may include various features such as new game rules, features, video and audio content; download or enable game specific challenges, such as timed play high score challenge; new or remixed music or video related features; player or character avatars; Soundtracks and additional music; birthday and holiday related events in game; and additional game "skins" and game character modifications, etc.

Cooperative play may include: collaboration with friends to achieve game progression, states, or scores; cooperative play in real time or "play anytime" modes; events within games that are affected by one or the other player(s). Cross platform gameplay may include playing digital version of pinball on a smartphone app may be integrated with the physical pinball machine to include various features, such as unlocked features, etc. or cooperative play including one player working on a digital version, while a second player plays the physical pinball machine.

Example merit badges and high score tables include earning merit badges and providing checkpoints for playing various games or for making various achievements during gameplay. The high score tables may then be utilized locally, regionally, and/or worldwide.

In addition, the disclosed system architecture accommodates features which can be utilized to facilitate a robust player loyalty system to increase enjoyment and a gamification component used to drive play and increase participation in community events. The example frequent player program may include any suitable player reward including: earn loyalty points, swag, free games, etc.; providing points towards game purchases; and providing various reward levels, such as gold, platinum, world status, etc.

Still further, facilitating tournament related interaction may include the providing of: leagues—interactions relative to league nights, etc.; checking standings, facilitation of tournament sign up and/or rankings; and tracking progress in the tournament, etc. Related, events and game manufacturing news may be provided to the players including: staying updated on events, releases, news; getting notified of personally relevant events, etc. (e.g., "your game will update tonight"); manufacturer specific features, such as new game titles, sales, etc.

The game location database and find your friend features allow for a player to find games, follow friends, pinball celebrities, locations, etc. (and compete against celebrities in various virtual competitions), find events on the fly: "what's going on tonight?", etc.

Finally, additional functions may include: the ability to level the physical game machine; providing play tips and tricks from professional players and/or the game designers; providing access and stream game specific tutorials; and technology troubleshooting as needed.

Additional features of the networked pinball machines may include:

Allow locations to advertise. The server's website includes a partner page where the player/operator can see a list of partners that are willing to advertise their approved art in various attract modes. Location owners can go to the website and pick and choose which of the partners, if any, make sense for their location. If the operator chooses one or more advertisements, the location may share in the proceeds. No games would advertise without the owner's permission. Allowing the locations to choose the advertising gives them control. Advertisements may be time sensitive and can expire.

Allow players to subscribe to other players or locations. Games can publish high score tables to a website. Players can decide which tables mean something to them and the data can be automatically collated for the player ignoring all the tables the players doesn't care about. Because a player can take the glass off and "cheat" (community defined) in many other ways the scores can be audited for assurances that the game is a legitimate score. Players and operators can rate other players and/or locations. Ratings can be used as a filter for customers in many ways. The website can provide the players and operators their own dashboard to view their player data, as well as machine data, such as heat maps, shot selections, etc. Players can customize the dashboard with data that is important to them. Players can add their scores to various auto-collated high score tables as desired, allowing the player to compete with their friends and players.

Finally, the customized dashboard can provide the player with news and updates from their subscriptions automatically and their high score tables can be automatically updated with new scores and achievements made by others they care about.

Race for the Sun. By coupling the pinball machine to a network and providing the machine the ability to update and/or modify code, the pinball machine can procedurally change in many ways both physically and by rules. The software can change what it takes to beat the game, such as for instance, changing what the game goals are. In one example, rules can be changed at a specific time, such as all the games with this feature turned on will update and change their rules and goals at midnight. The rules can be time sensitive, such as for instance, it could allow players 24 hours to play and beat the new configuration. Once beaten the game will end in a celebration. Showing the player his score and time. A player's time and score can be saved to a global high score table that people will have filtered to their taste and player's will only compete with other people/locations that they care about. In addition, players can then try to improve their time or score before the 24 hours runs out. If the player doesn't like the rules/goals of today configuration there is always tomorrow. Each day it will be new again.

Camera options. The pinball machine can include a camera or allow for a camera accessory. In this manner, players can stream their game play and screen with an accompanying and appropriate art. Control of their stream may be provided with a player's dashboard. The output of their game screen as well as the camera could all be configured from the dashboard. As such, the pinball machine can be easily configured for social network interaction.

Microphone Options. The pinball machine can also include a microphone or allow for a microphone accessory. In this instance, a player can chat with and compete with a player from another location. The player can also have a party line with more than one player on the "line" at a time.

Checkpoints. Pinball machines currently do not allow for persistence in gaming. The example pinball machines disclosed herein can know who is playing, and the player can leave at the end of any leg of the game and be returned to his last checkpoint the next time he walks up to the game. Checkpoints can be enhanced and/or further defined with DLC and/or updates.

Achievements that mean something. The server can identify various achievements for players to accomplish. Example achievements may comprise a small icon and phrase both reminding and representing the accomplishment. For example, after killing 100 fighters in a themed pinball game, the player could receive the "FIGHTER ACHIEVEMENT" for 100 kills, associated with their player ID. The player can accumulate items in an inventory on the server and view the saved achievements on their dashboard.

Challenge. A challenge may be a gameplay with a few basic goals that the game team defines for a particular game. For instance, a challenge could be a two-minute multi-ball where the goal is to score as much as you can in two minutes. In this example, the challenges are typically short in duration, such as 2 or 3 minutes and include a timer. A player with a game that wants to play against someone else (when they are alone), may challenge someone in a different location. The player may connect with the server online and enter a virtual challenge "room" for their game. When someone else also enters this lobby, they can start a challenge. This other player can be anywhere in the world and both players play the challenge, competing to reach the challenge objective.

Group Play/Team Play. There are features on the example game that must be competed with a group of people. Each person has to do one or more features. When all players complete their respective features, the group may obtain credit and/or an achievement badge. Similarly, there are features on the example game that allow a first and second player to compete against a third and fourth player, either on the same machine or on separate networked machines. At the end of a game each team's score are added together to determine the team that wins.

Games will connect. Players will create profiles and access limited features at the manufacturer's loyalty program. Games will recognize players (e.g., QR interface), profiles will update. Games will download and install code updates.

While specific examples of the present invention have been disclosed in detail, it will be appreciated by one of ordinary skill in the art that that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

We claim:

1. A pinball machine comprising:
   a cabinet;
   an inclined playfield supported by the cabinet;
   a ball operable across an upperside of the playfield to conduct a gameplay;
   a plurality of playfield accessories mounted to the playfield and configured to interact with the ball during gameplay;
   a controller coupled to the plurality of playfield accessories, the controller configured to store and execute computer readable instructions to control gameplay;
   a network connection operably coupling the controller to a network; and
   an access device operably coupled to the controller, the access device configured to identify a user and receive authorization from the controller to allow the user to conduct a gameplay,
   wherein the access device is activatable by the user to request user identification and authorization by the controller,
   wherein the controller is configured to transmit the request for user identification and authorization to a remote server by the network connection,
   wherein the controller is configured to receive user identification and authorization from the remote server by the network connection,
   wherein the controller is configured to initiate gameplay upon receipt of user identification and authorization, and
   wherein the controller is configured to control gameplay local to the pinball machine when at least one of user identification or authorization fails, or if the network is unavailable.

2. The pinball machine as recited in claim 1, wherein the controller is further configured to transmit gameplay data to the remote server by the network connection at least during or after gameplay.

3. The pinball machine as recited in claim 1, wherein the controller is further configured to receive supplementary gameplay data from the remote server by the network connection indicative of cumulative gameplay stored by the remote server.

4. The pinball machine as recited in claim 3, wherein the supplementary gameplay data includes gameplay score data.

5. The pinball machine as recited in claim 1, wherein the controller is further configured to receive modified computer readable instructions from the remote server to control gameplay.

6. The pinball machine as recited in claim 1, wherein the access device is at least one of an optical scanner, a camera, or a magnetic scanner.

7. The pinball machine as recited in claim 6, wherein the access device is configured to read a bar code uniquely identifying the user.

8. The pinball machine as recited in claim 1, further comprising a camera coupled to the controller.

9. The pinball machine as recited in claim 8, further comprising a microphone coupled to the controller.

10. The pinball machine as recited in claim 1, further comprising a coin acceptance device coupled to the controller to cause the controller to initiate gameplay upon receipt of sufficient consideration by the coin acceptance device.

11. The pinball machine as recited in claim 10, wherein the coin acceptance device and the access device are integral devices.

12. A pinball gaming network comprising:
a remote server coupled to a network and comprising storage configured to store at least one of gameplay information, computer readable instructions for controlling gameplay, and user information and authorization data;
a pinball machine coupled to the network and configured to communicate with the remote server, the pinball machine comprising:
a cabinet;
an inclined playfield supported by the cabinet;
a ball operable across an upperside of the playfield to conduct the gameplay;
a plurality of playfield accessories mounted to the playfield and configured to interact with the ball during gameplay;
a controller coupled to the plurality of playfield accessories, the controller configured to store and execute the computer readable instructions to control gameplay; and
an access device operably coupled to the controller, the access device configured to identify a user and receive authorization from the controller to allow the user to conduct a gameplay,
wherein the access device is activatable by the user to request user identification and authorization by the controller,
wherein the controller is configured to transmit the request for user identification and authorization to the remote server by the network,
wherein the controller is configured to receive user identification and authorization from the remote server by the network,
wherein the controller is configured to initiate gameplay upon receipt of user identification and authorization, and
wherein the controller is configured to control gameplay local to the pinball machine when at least one of user identification or authorization fails, or if the network is unavailable.

13. The pinball gaming network as recited in claim 12, wherein the controller is further configured to transmit gameplay data to the remote server by the network at least during or after gameplay.

14. The pinball gaming network as recited in claim 12, wherein the controller is further configured to receive supplementary gameplay data from the remote server by the network indicative of cumulative gameplay stored by the remote server.

15. The pinball gaming network as recited in claim 12, wherein the controller is further configured to receive modified computer readable instructions from the remote server to control gameplay.

16. The pinball gaming network as recited in claim 12, wherein the access device is at least one of an optical scanner, a camera, or a magnetic scanner.

17. The pinball gaming network as recited in claim 16, wherein the access device is configured to read a bar code uniquely identifying the user.

* * * * *